(12) United States Patent
Randell et al.

(10) Patent No.: US 10,277,494 B2
(45) Date of Patent: Apr. 30, 2019

(54) DEVICE AND METHOD FOR ANTENNA ALIGNMENT USING VIBRATIONAL POSITIONING

(71) Applicant: BLACKBERRY LIMITED, Waterloo (CA)

(72) Inventors: Jerrold Richard Randell, Waterloo (CA); Mohammed Nawaf Smadi, Ancaster (CA); Jeffrey Ronald Clemmer, New Dundee (CA); Anthony Hu, Kitchener (CA)

(73) Assignee: BLACKBERRY LIMITED, Waterloo, Ontario ( * ) Notice: Subject to any disclaimer, the term of this patent is extended or adjusted under 35 U.S.C. 154(b) by 157 days.

(21) Appl. No.: 15/242,680

(22) Filed: Aug. 22, 2016

(65) Prior Publication Data

US 2018/0053995 A1 Feb. 22, 2018

(51) Int. Cl.
*H01Q 1/24* (2006.01)
*H01Q 3/02* (2006.01)
(Continued)

(52) U.S. Cl.
CPC .......... *H04L 43/16* (2013.01); *H01Q 1/1257* (2013.01); *H04W 4/00* (2013.01); *H04W 4/80* (2018.02);
(Continued)

(58) Field of Classification Search
CPC .......... H01Q 1/24; H01Q 1/241; H01Q 1/242; H01Q 1/243; H01Q 3/02; H01Q 3/12;
(Continued)

(56) References Cited

U.S. PATENT DOCUMENTS 8,731,503 B2 * 5/2014 Kangas ................ H04B 17/309
455/226.2
9,559,754 B2 * 1/2017 Holtman ............... G06F 1/1632
(Continued)

FOREIGN PATENT DOCUMENTS

WO 2010134527 A1 11/2010
WO 2014162502 A1 9/2014

OTHER PUBLICATIONS

Extended European Search Report, dated Dec. 15, 2017, by EPO, re European Patent Application No. 17185757.6.

*Primary Examiner* — Daniel Munoz
*Assistant Examiner* — Patrick R Holecek
(74) *Attorney, Agent, or Firm* — Perry + Currier Inc.

(57) ABSTRACT

A device and method for antenna alignment using vibrational positioning are provided. The device comprises: a controller; a vibrating device; and an antenna. The controller configured monitors a data quality parameter of the antenna. When the data quality parameter meets a first threshold condition, the controller activates the vibrating device. When a second threshold condition is met, after the vibrating device is activated, the controller deactivates the vibrating device. Activation of the vibrating device can cause the device to vibrate to move the device into a minimum energy position on a docking station to align the antenna with a respective antenna of the docking station. The docking station can comprise a wireless charging pad and the alignment of the antenna (e.g. a loop antenna and the like) with the respective antenna of the docking station can assist with charging efficiency of a battery of the device.

20 Claims, 12 Drawing Sheets

(51) Int. Cl.
    *H04L 12/26*     (2006.01)
    *H04W 4/80*     (2018.01)
    *H01Q 1/12*     (2006.01)
    *H04W 4/00*     (2018.01)
    *H01Q 7/00*     (2006.01)
    *G06F 1/16*     (2006.01)
    *H04B 1/3877*     (2015.01)

(52) U.S. Cl.
    CPC ........... *G06F 1/1632* (2013.01); *H01Q 1/243* (2013.01); *H01Q 3/02* (2013.01); *H01Q 7/00* (2013.01); *H04B 1/3877* (2013.01); *Y02D 70/00* (2018.01); *Y02D 70/1222* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/166* (2018.01); *Y02D 70/40* (2018.01)

(58) Field of Classification Search
    CPC ..... H01Q 1/1257; H04B 1/3877; H04W 4/00; H04W 4/80; H04L 43/16
    See application file for complete search history.

(56) References Cited

U.S. PATENT DOCUMENTS

| | | |
|---|---|---|
| 2013/0281014 A1 | 10/2013 | Frankland et al. |
| 2014/0168012 A1* | 6/2014 | Mankowski ............ H04W 4/20 342/359 |
| 2014/0168356 A1 | 6/2014 | Francois et al. |
| 2014/0242911 A1 | 8/2014 | Holtman et al. |
| 2016/0189495 A1 | 6/2016 | Yin et al. |

* cited by examiner

DEVICE AND METHOD FOR ANTENNA ALIGNMENT USING VIBRATIONAL POSITIONING

FIELD

The specification relates generally to antennas, and specifically to a device and method for antenna alignment using vibrational positioning.

BACKGROUND

In systems and devices that utilize antennas to communicate, it is sometimes needed to align and position the antennas to provide optimal performance. For example, when reception at a mobile device is poor, a user using the mobile device can move the mobile device until reception improves. However, such techniques rely on a manual determination of the quality of the reception, and manual movement of the device, which can be inefficient. Furthermore, such devices are not always being held by a user, but are often resting on surfaces and/or located at docking stations.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
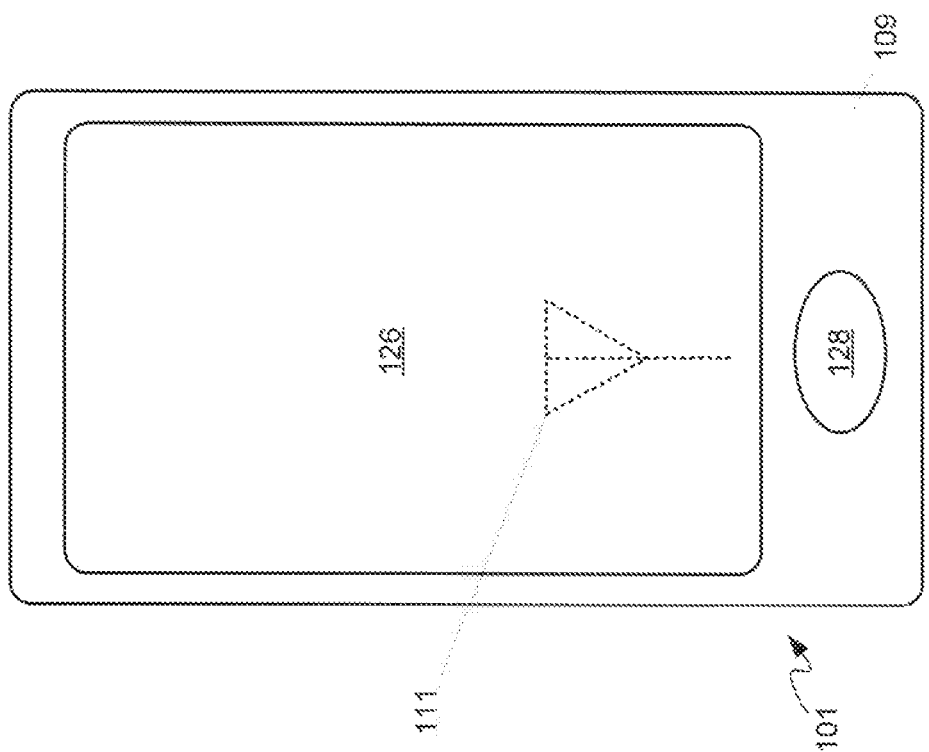
FIG. 1 depicts a front perspective view of a device for antenna alignment using vibrational positioning, according to non-limiting implementations.

The present disclosure describes examples of a device that include a controller, an antenna and a vibrating device, such as a haptic feedback vibrating motor. The controller monitors a data quality parameter of the antenna, such as an error rate and/or a bit error rate. When the data quality parameter meets a threshold condition, such as the error rate being above a threshold error rate, the controller activates the vibrating device to attempt to move the device, and hence the antenna, to affect reception and hence affect the data quality parameter and/or reduce the error rate. The vibrating device is deactivated when a second threshold condition is met, for example the vibrating device being activated for a given time period and/or the error rate falling below the threshold error rate. In some implementations, the device can be in a docking station, and the antenna of the device can be receiving data from an antenna at the docking station; activation of the vibrating device can cause the device to reposition itself, and hence the antenna, to a minimum energy position in the docking station where respective antennas of the device and the docking station are aligned.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may comprise discrete components that may be fastened together in any fashion. Physical connections may also include a combination of discrete components fastened together, and components fashioned as a single piece.

Furthermore, as will become apparent in this specification, certain antenna components may be described as being configured for generating a resonance at a given frequency and/or resonating at a given frequency and/or having a resonance at a given frequency. In general, an antenna component that is configured to resonate at a given frequency, and the like, can also be described as having a resonant length, a radiation length, a radiating length, an electrical length, and the like, corresponding to the given frequency. The electrical length can be similar to, or different from, a physical length of the antenna component. The electrical length of the antenna component can be different from the physical length, for example by using electronic components to effectively lengthen the electrical length as compared to the physical length. The term electrical length is most often used with respect to simple monopole and/or dipole antennas. The resonant length can be similar to, or different from, the electrical length and the physical length of the antenna component. In general, the resonant length corresponds to an effective length of an antenna component used to generate a resonance at the given frequency; for example, for irregularly shaped and/or complex antenna components that resonate at a given frequency, the resonant length can be described as a length of a simple antenna component, including but not limited to a monopole antenna and a dipole antenna, that resonates at the same given frequency.

An aspect of the specification provides a device comprising: a controller; a vibrating device; and an antenna; the controller configured to: monitor a data quality parameter of the antenna; when the data quality parameter meets a first threshold condition, activate the vibrating device; and, when a second threshold condition is met, after the vibrating device is activated, deactivate the vibrating device.

The data quality parameter can comprise an error rate of data received by the antenna; and the first threshold condition can comprise the error rate being above a threshold error rate.

The data quality parameter can comprise an error rate of data received by the antenna; the first threshold condition can comprise the error rate being above a threshold error rate; and the controller can further comprise an error checker configured to determine one or more of the error rate, a number of errors and types of the errors.

The second threshold condition can comprise one or more of: a total time of the vibrating device being activated exceeding a time out period; and an error rate of data received by the antenna falling below a threshold error rate.

The device can further comprise a chassis configured to rest in a minimum energy position of a docking station.

The antenna can comprise one or more of a short range antenna, an induction antenna and a loop antenna configured to receive one or more of power and data from an external short range antenna.

The device can further comprise a battery and a battery charging device, the antenna configured to receive power from one or more of an external short range antenna, an inductive charging station and a wireless charging pad, the battery charging device configured to charge the battery using the power.

Another aspect of the specification provides a method comprising: at a device including: a controller, a vibrating device; and an antenna, monitoring, at the controller, a data quality parameter of the antenna; when the data quality parameter meets a first threshold condition, activating the vibrating device; and, when a second threshold condition is met, after the vibrating device is activated, deactivating the vibrating device.

The data quality parameter can comprise an error rate of data received by the antenna; and the first threshold condition can comprise the error rate being above a threshold error rate.

The data quality parameter can comprise an error rate of data received by the antenna; the first threshold condition can comprise the error rate being above a threshold error rate; and the device can further comprise an error checker configured to determine one or more of the error rate, a number of errors and types of the errors.

The second threshold condition can comprise one or more of: a total time of the vibrating device being activated exceeding a time out period; and an error rate of data received by the antenna falling below a threshold error rate.

The device can further comprise a chassis configured to be received in a minimum energy position of a docking station.

The antenna can comprise one or more of a short range antenna, an induction antenna and a loop antenna configured to receive one or more of power and data from an external short range antenna.

The device can further comprise a battery and a battery charging device, the antenna configured to receive power from one or more of an external short range antenna, an inductive charging station and a wireless charging pad, the battery charging device configured to charge the battery using the power.

Yet a further aspect of the specification provides a system comprising: a device including: a controller; a vibrating device; an antenna; and a chassis, the controller configured to: monitor a data quality parameter of the antenna; when the data quality parameter meets a first threshold condition, activates the vibrating device; and, when a second threshold condition is met, after the vibrating device is activated, deactivate the vibrating device; and, a docking station comprising a respective antenna and a minimum energy position configured to receive the chassis of the device such that the antenna of the device and the respective antenna of the docking station are in alignment when the chassis is received in the minimum energy position, the respective antenna configured to transmit data to the antenna of the device.

The data quality parameter can comprise an error rate of the data received by the antenna; the first threshold condition can comprise the error rate being above a threshold error rate; and the controller can further comprise an error checker configured to determine one or more of the error rate, a number of errors and types of the errors.

The data quality parameter can comprise an error rate of the data received by the antenna; the first threshold condition can comprise the error rate being above a threshold error rate; and the docking station can further comprise a data generator and a forward error correction code insertion module.

The antenna of the device can comprise one or more of a short range antenna, an induction antenna and a loop antenna configured to receive one or more or power and data from the respective antenna of the docking station.

The device can further comprise a battery and a battery charging device, and the docking station can comprise one or more of an inductive charging station and a wireless charging pad, the battery charging device configured to charge the battery using power received by the antenna from the respective antenna of the docking station.

Yet a further aspect of the specification provides a computer-readable medium storing a computer program, wherein execution of the computer program is for: at a device including: a controller; a vibrating device; and an antenna, monitoring, at the controller, a data quality parameter of the antenna; when the data quality parameter meets a first threshold condition, activating the vibrating device; and, when a second threshold condition is met, after the vibrating device is activated, deactivating the vibrating device. The computer-readable medium can comprise a non-transitory computer-readable medium FIGS. 1 and 2 respectively depict a front perspective view and a schematic diagram of a mobile electronic device 101, referred to interchangeably hereafter as device 101. Device 101 comprises: a controller 120; a vibrating device 121; and an antenna 111. Configurations of device 101 and antenna 111 will be described in further detail below. Antenna 111 is depicted in outline in FIG. 1 indicating an example position of antenna 111 relative to external components of device 101, as antenna 111 can generally be located internal to device 101. However, the position of antenna 111 is understood to be an example only and antenna 111 can be located at any position at device 101 including, but not limited to, at one or more of a front, rear and sides of device 101, and one or more of internal to device 101 and at an exterior surface of device 101. In addition, while antenna 111 is depicted schematically, antenna 111 can have any shape particular to one or more antenna types and/or one or more bandwidths, including, but not limited to, a long range antenna, a short range antenna, a WiFi antenna, a cellular antenna, and the like.

Device 101 further comprises a chassis 109, a controller 120, a memory 122, a display device 126, a communication interface 124, at least one input device 128, a speaker 132, a microphone 134, a battery charging device 198 and a battery 199. Controller 120 is generally configured to: monitor a data quality parameter of antenna 111; when the data quality parameter meets a first threshold condition, activate vibrating device 121; and, when a second threshold condition is met, after vibrating device 121 is activated, deactivate vibrating device 121.

Device 101 can be any type of electronic device that can be used in a self-contained manner to communicate with one or more communication networks using antenna 111. Device 101 can include, but is not limited to, any suitable combination of electronic devices, communications devices, computing devices, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations. In particular device 101 comprises any device configured to move and/or change position when positioned on a surface and/or in a docking station when vibrating device 121 is activated.

Figure 2:
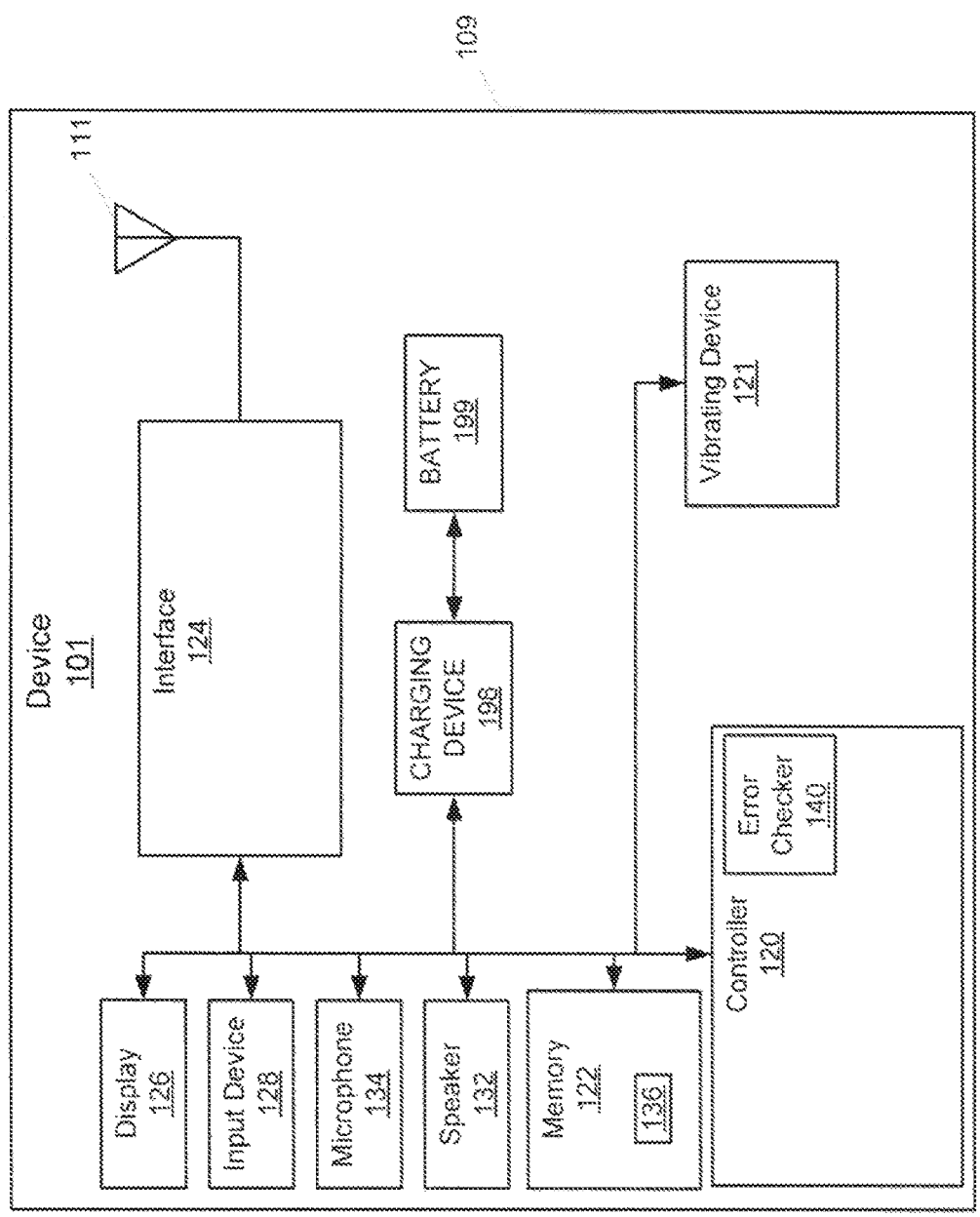
FIG. 2 depicts a schematic diagram of the device of FIG. 1, according to non-limiting implementations.

Hence, it should be emphasized that the shape and structure of device 101 in FIGS. 1 and 2 are purely examples, and contemplate a device that can be used for both wireless voice (e.g. telephony) and wireless data communications (e.g. email, web browsing, text, and the like). However, FIG. 1 contemplates a device that can be used for any suitable specialized functions, including, but not limited to, one or more of, telephony, computing, appliance, and/or entertainment related functions.

Vibrating device 121 can comprise one or more of a haptic device, a haptic feedback device, a vibrating motor and the like. Regardless, vibrating device 121, when activated and/or turned on by controller 120 causes device 101 to vibrate which can, in turn, cause device 101 to reposition itself with respect to a surface on which device 101 is positioned and/or with respect to a docking station within which device 101 is located, as described in more detail below.

Controller 120 further comprises a processor and/or a plurality of processors, including but not limited to one or more central processors (CPUs) and/or one or more processing units; either way, controller 120 comprises a hardware element and/or a hardware processor. Indeed, in some implementations, controller 120 can comprise an ASIC (application-specific integrated circuit) and/or an FPGA (field-programmable gate array) specifically configured to implement the functionality of controller 120.

In other words, controller 120 can be specifically adapted for antenna alignment using vibrational positioning. Hence, controller 120 is preferably not a generic computing device, but a device specifically configured to implement antenna alignment functionality using vibrational positioning. For example, controller 120 can specifically comprise a computer executable engine configured to implement specific antenna alignment using vibrational positioning, as described below.

Memory 122 can comprise a non-volatile storage unit (e.g. Erasable Electronic Programmable Read Only Memory ("EEPROM"). Flash Memory) and a volatile storage unit (e.g. random access memory ("RAM")). Programming instructions that implement the functional teachings of controller 120 as described herein are typically maintained, persistently, in memory 122 and used by controller 120 which makes appropriate utilization of volatile storage during the execution of such programming instructions. Those skilled in the art recognize that memory 122 is an example of computer readable media that can store programming instructions executable by controller 120. Furthermore, memory 122 is also an example of a memory unit and/or memory module and/or a non-volatile memory.

Memory 122 generally stores an application 136 which, when processed by controller 120, enables controller 120 to: monitor a data quality parameter of antenna 111; when the data quality parameter meets a first threshold condition, activate vibrating device 121; and, when a second threshold condition is met, after vibrating device 121 activated, deactivate vibrating device 121.

For example, in some implementations, the data quality parameter comprises one or more of an error rate of data received by antenna 111, a bit error rate of data received by antenna 111, and the like. Hence, in these implementations, as depicted in FIG. 2, controller 120 can comprise an error checker 140 configured to determine an error rate and/or a bit error rate of data received by antenna 111. Such an error checker 140 can be further configured to determine one or more of the error rate, a number of errors and types of the errors. In these implementations, the first threshold condition can comprises the error rate being above a threshold error rate, which can be configured using application 136. For example, the threshold error rate can comprise an error rate at which data received by antenna 111 begins to be unusable and/or an error rate at which the data received by antenna 111 at which a voice/and the like, encoded in the data begins to "break up". Such a threshold error rate can be determined heuristically and be provisioned at device 101 and/or at memory 122 and/or at application 136 in a provisioning process and/or at a factory. Furthermore, such a threshold error rate can be set and/or changed using a menu system, and/the like, and by receiving input at input device 128 to access the menu system, and the like.

Furthermore, the error rate can comprise an error rate for a given type of error, for example, errors associated with data quality and/or data integrity and/or Forward Error Correction codes applied to the data received at antenna 111, but not other types of errors, for example errors not associated with Forward Error Correction codes applied to the data received at antenna 111.

Furthermore, in these implementations, the second threshold condition can comprise one or more of: a total time of vibrating device 121 being activated exceeding a time out period; and an error rate of data received by antenna 111 falling below the threshold error rate. Hence, for example, when controller 120 activates vibrating device 121, device 101 vibrates and repositions; controller 120 continues to monitor the data quality parameter of antenna 111 and deactivates vibrating device 121 after a timeout period and/or when the error rate of data received by antenna 111 falls below the threshold error rate. The timeout period prevents vibrating device 121 from being in an activated state indefinitely in the event the vibrating and/or repositioning of device 101 does not result in the error rate of data received by antenna 111 falling.

Alternatively, the second threshold condition can comprise the error rate of data received by antenna 111 increasing at a threshold rate. For example, in these implementations, activation of vibrating device 121 can cause the error rate to increase and rather than controller 120 controlling vibrating device 121 to be activated for the entirety of a timeout period, controller 120 can deactivate vibrating device 121 when the error rate increases at a threshold rate.

Such a timeout period can be determined heuristically and be provisioned at device 101 and/or at memory 122 and/or at application 136 in a provisioning process and/or at a factory. Furthermore, such a timeout period can be set and/or changed using a menu system, and/the like, and by receiving input at input device 128 to access the menu system, and the like In other implementations, however, the data quality parameter can comprise a signal strength and/or a received signal strength of antenna 111; in these implementations, error checker 140 can be optional. Furthermore, in these implementations, the first threshold condition can comprise a signal strength and/or a received signal strength of antenna 111 falling below a threshold signal strength and/or a threshold received signal strength, and the second threshold condition can comprise one or more of; a total time of vibrating device 121 being activated exceeding a time out period; and signal strength and/or received signal strength of antenna 111 exceeding the threshold signal strength and/or received signal strength of antenna 111 exceeding the threshold signal strength and/or the threshold received signal strength.

For example, the threshold signal strength and/or the threshold received signal strength can comprise a signal strength and/or a received signal strength at which data received by antenna 111 begins to be unusable, and/or a signal strength and/or a received signal strength at which the data received by antenna 111 at which a voice/and the like, encoded in the data begins to "break up". Such a threshold signal strength and/or a threshold received signal can be determined heuristically and be provisioned at device 101 and/or at memory 122 and/or at application 136 in a provisioning process and/or at a factory. Furthermore, such a threshold signal strength and/or a threshold received signal can be set and/or changed using a menu system, and/the like, and by receiving input at input device 128 to access the menu system, and the like.

Alternatively, the second threshold condition can comprise the signal strength and/or a received signal strength of data received by antenna 111 decreasing at a threshold rate. For example, in these implementations, activation of vibrating device 121 can cause the signal strength and/or a received signal strength to decrease and rather than controller 120 controlling vibrating device 121 to be activated for the entirety of a timeout period, controller 120 can deactivate vibrating device 121 when signal strength and/or a received signal strength decreases at a threshold rate.

Controller 120 can be further configured to communicate with display device 126, input device 128, speaker 132 and microphone 134. Display device 126 comprises any suitable one of, or combination of, flat panel displays (e.g. LCD (liquid crystal display), plasma displays, OLED (organic light emitting diode) displays, capacitive or resistive touch-screens, CRTs (cathode ray tubes) and the like.

At least one input device 128 is generally configured to receive input data, and can comprise any suitable combination of input devices, including but not limited to a keyboard, a keypad, a pointing device (as depicted in FIG. 1), a mouse, a track wheel, a trackball, a touchpad, a touch screen and the like. Other suitable input devices are within the scope of present implementations.

Speaker 132 comprises any suitable speaker for converting audio data to sound to provide one or more of audible alerts, audible communications from remote communication devices, and the like. Microphone 134 comprises any suitable microphone for receiving sound and converting to audio data. In some implementations, input device 128 and display device 126 are external to device 101, with controller 120 in communication with each of input device 128 and display device 126 via a suitable connection and/or link.

Controller 120 also connects to communication interface 124 (interchangeably referred to as interface 124), which can be implemented as one or more radios and/or connectors and/or network adaptors, and/or configured to wirelessly communicate with one or more communication networks (not depicted) via antenna 111. It will be appreciated that interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications). CDMA (Code division multiple access), FDD (frequency division duplexing), LTE (Long Term Evolution). TDD (time division duplexing), TDD-LTE (TDD-Long Term Evolution). TD-SCDMA (Time Division Synchronous Code Division Multiple Access) and the like, wireless data. Bluetooth links, NFC (near field communication) links. WLAN (wireless local area network) links. WiFi links, WiMax links, packet based links, the Internet, analog networks, the PSTN (public switched telephone network), access points, and the like, and/or a combination.

Specifically, interface 124 comprises radio equipment (i.e. a radio transmitter and/or radio receiver) for receiving and transmitting signals using antenna 111.

Alternatively, interface 124 can be configured to inductively received power using antenna 111 and use such power to charge a battery (not depicted), and the like, of device 101.

Similarly, antenna 111 can comprise any suitable combination of antennas which enables device 101 to communicate over a communication network according to any given protocol; antenna 111 is hence generally configured to configured for generating a resonance at a given frequency and/or resonating at a given frequency and/or having a resonance at a given frequency that is compatible with one or more communication networks over which the radio equipment of interface 124 is to communicate. Furthermore, antenna 111 can comprise a short-range antenna configured to inductively received power to charge battery 199, and the like, of device 101, using battery charging device 198, which can comprise a regulator and the like; in such implementations, antenna 111 can include one or more of an induction antenna and a loop antenna configured to receive power from corresponding external induction antenna and/or loop antenna which is received at charging device 198 and used to charge battery 199.

Hence, device 101 further comprises a power source, for example battery 199 or the like. In some implementations the power source can comprise a connection to a mains power supply and a power adaptor (e.g. and AC-to-DC (alternating current to direct current) adaptor).

In any event, it should be understood that a wide variety of configurations for device 101 are contemplated.

Figure 3:
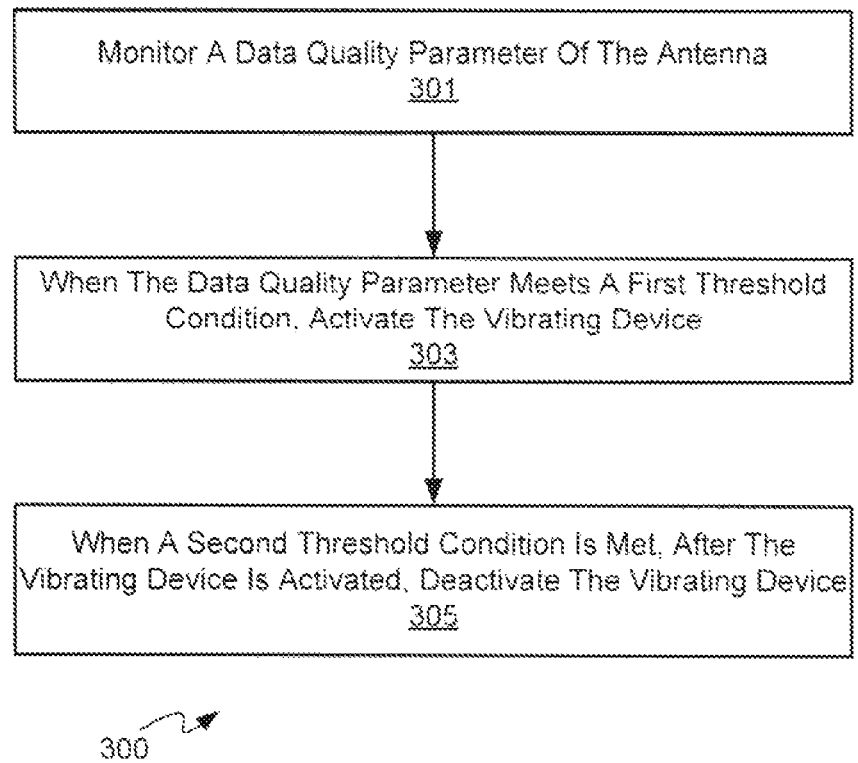
FIG. 3 depicts a block diagram of a flowchart of a method for antenna alignment using vibrational positioning, according to non-limiting implementations.

Attention is now directed to FIG. 3 which depicts a flowchart of a method 300 for antenna alignment using vibrational positioning, according to non-limiting implementations. In order to assist in the explanation of method 300, it will be assumed that method 300 is performed using device 101, and specifically by controller 120, for example when controller 120 processes application 136. Indeed, method 300 is one way in which device 101 and/or controller 120 can be configured. Furthermore, the following discussion of method 300 will lead to a further understanding of controller 120, and device 101 and its various components. However, it is to be understood that device 101 and/or controller 120 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of device 101 as well. Furthermore, while controller 120 is described as implementing and/or performing each block of method 300, it is appreciated that each block of method 300 occurs using controller 120 processing application 136.

At block 301, controller 120 monitors a data quality parameter of antenna 111.

At block 303, controller 120, when the data quality parameter meets a first threshold condition, activates vibrating device 121.

At block 305, controller 120, when a second threshold condition is met, after vibrating device 121 is activated, deactivates vibrating device 121.

Aspects of method 300 will now be described with respect to FIGS. 4 to 11.

Figure 4:
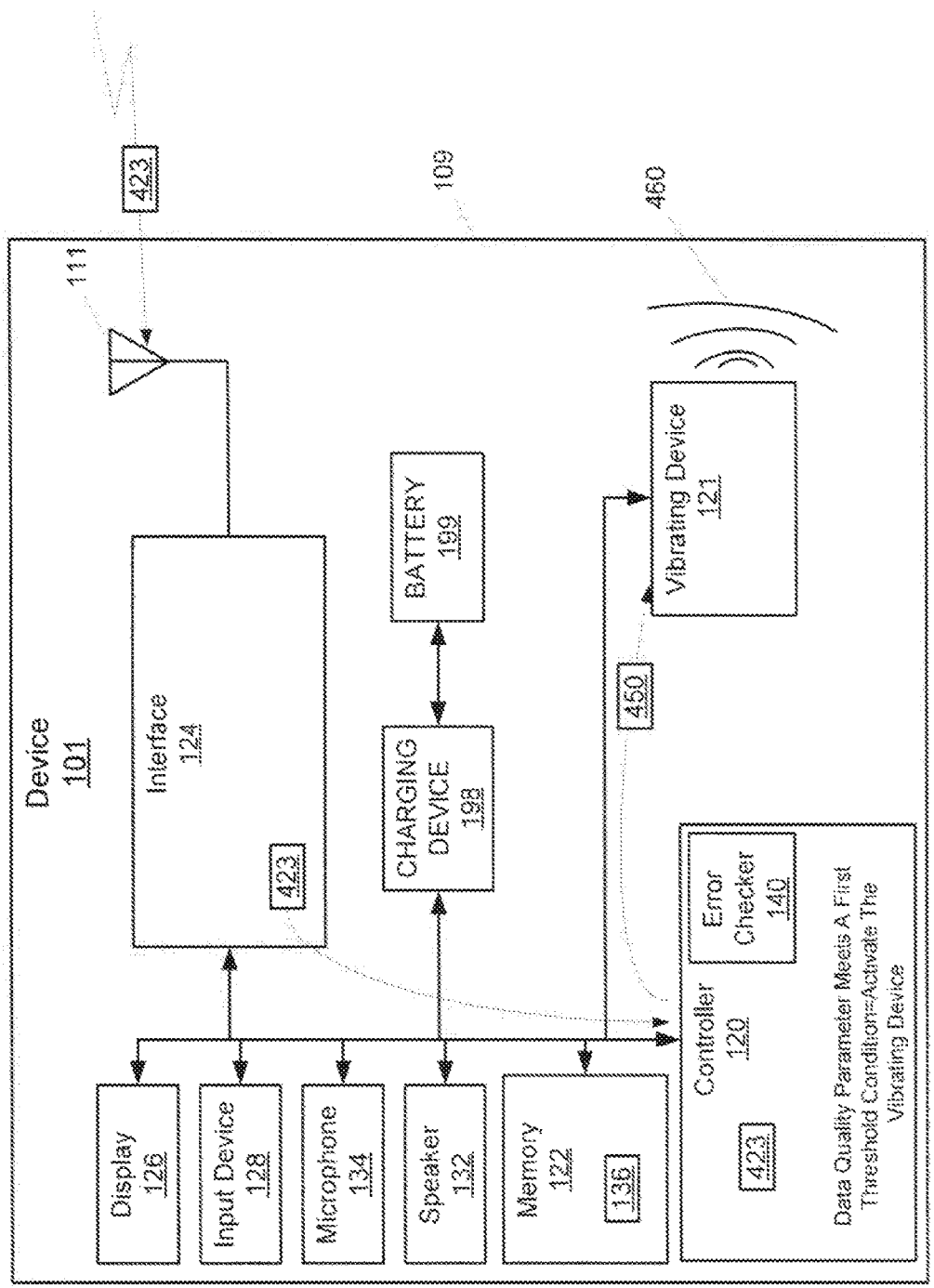
FIG. 4 depicts the device of FIG. 2 activating a vibrating device when a data quality parameter of an antenna meets a first threshold condition, according to non-limiting implementations.

Attention is next directed to FIG. 4, which is substantially similar to FIG. 2, with like elements having like numbers. In particular, in FIG. 4, antenna 111 receives data 423, for example from a communications network, a data channel, another antenna, and the like. Data 423 is received at controller 120, for example, using interface 124. Controller 120 monitors a data quality parameter of antenna 111 (e.g. at block 301 of method 300) by processing data 423 to determine an error rate and/or a bit error rate, for example using error checker 140; and/or controller 120 monitors a data quality parameter of antenna 111 (e.g. at block 301) by determining a signal strength and/or a received signal strength of data 423. Alternatively, rates of change of the error rate and/or the signal strength can also be monitored.

FIG. 4 also depicts a non-limiting example of blocks 303 of method 300; in particular, when the data quality parameter meets a first threshold condition (as described above), controller 120 activates vibrating device 121, for example by sending a command 450 to vibrating device 121 to activate and/or by controlling power to vibrating device 121 to activate and/or turn on vibrating device 121. As such, vibrating device 121 vibrates (as indicated by lines 460). The first threshold condition can include, but is not limited to one or more of: an error rate and/or a bit error rate of data 423 being above a threshold error rate; a signal strength received signal strength of antenna 111 falling below a threshold signal strength and/or a threshold received signal strength.

Figure 5:
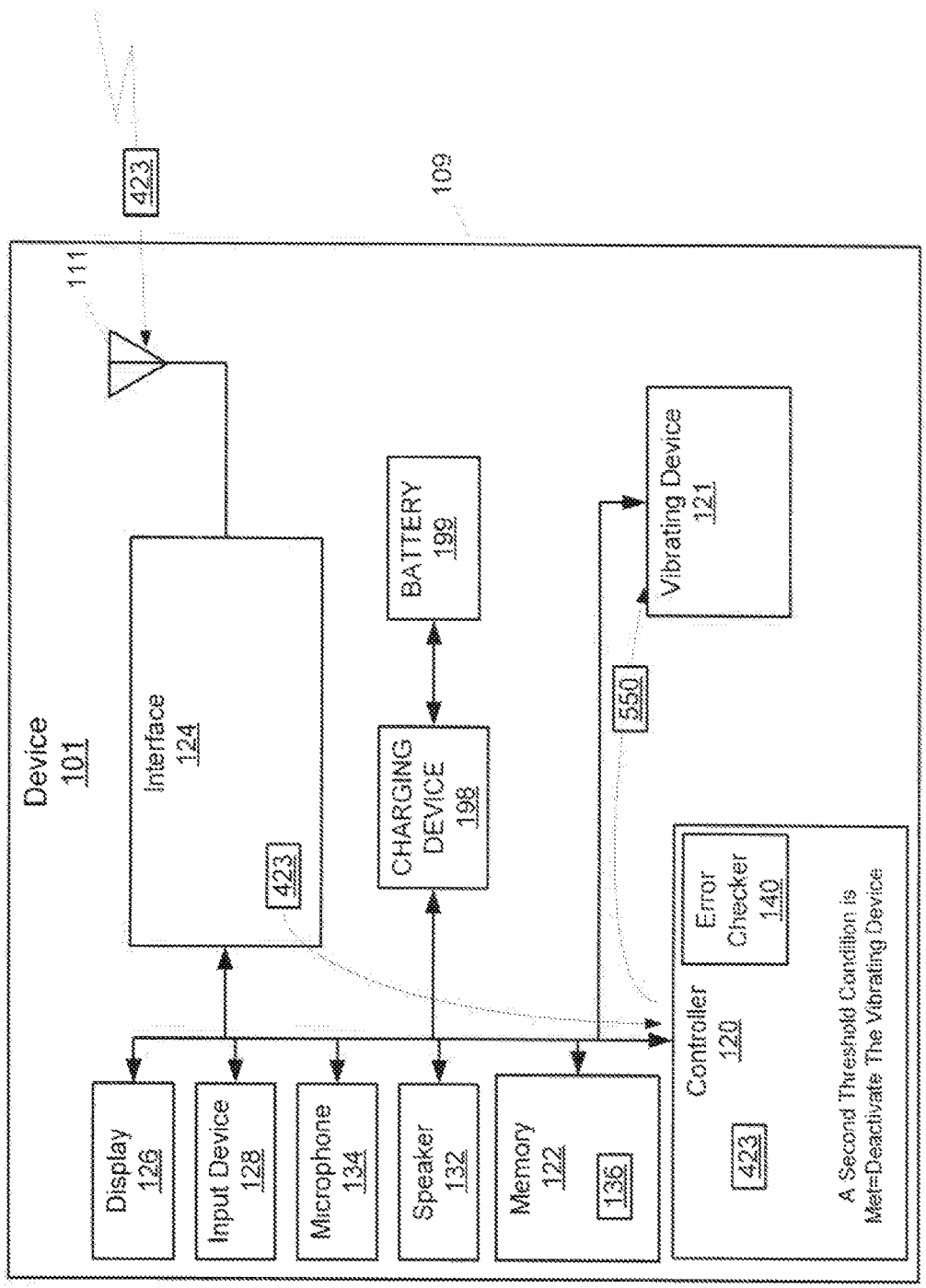
FIG. 5 depicts the device of FIG. 2 deactivation a vibrating device when a second threshold condition is met, according to non-limiting implementations.

Attention is next directed to FIG. 5, which is substantially similar to FIG. 4, with like elements having like numbers. In particular, in FIG. 5, antenna 111 continues to receive data 423 and controller 120 continues to monitor a data quality parameter of antenna 111 (e.g. at block 301 of method 300) by processing data 423 to determine an error rate and/or a bit error rate, for example using error checker 140; and/or controller 120 continues to monitor a data quality parameter of antenna 111 (e.g. at block 301) by determining a signal strength and/or a received signal strength of data 423.

FIG. 5 also depicts a non-limiting example of block 305 of method 300; in particular, when a second threshold condition is met (as described above), controller 120 activate vibrating device 121, for example by sending a command 550 to vibrating device 121 to deactivate and/or by controlling power to vibrating device 121 to deactivate and/or turn off vibrating device 121. As such, vibrating device 121 stops vibrating (e.g. as compared to FIG. 4). The second threshold condition can comprise one or more of: a total time of vibrating device 121 being activated exceeding a time out period; and/or an error rate of data 423 received by antenna 111 falling below the threshold error rate (and/or increasing at a threshold rate); and/or signal strength and/or received signal strength of antenna 111 exceeding the threshold signal strength and/or the threshold received signal strength (and/or decreasing at a respective threshold rate).

Figure 6:
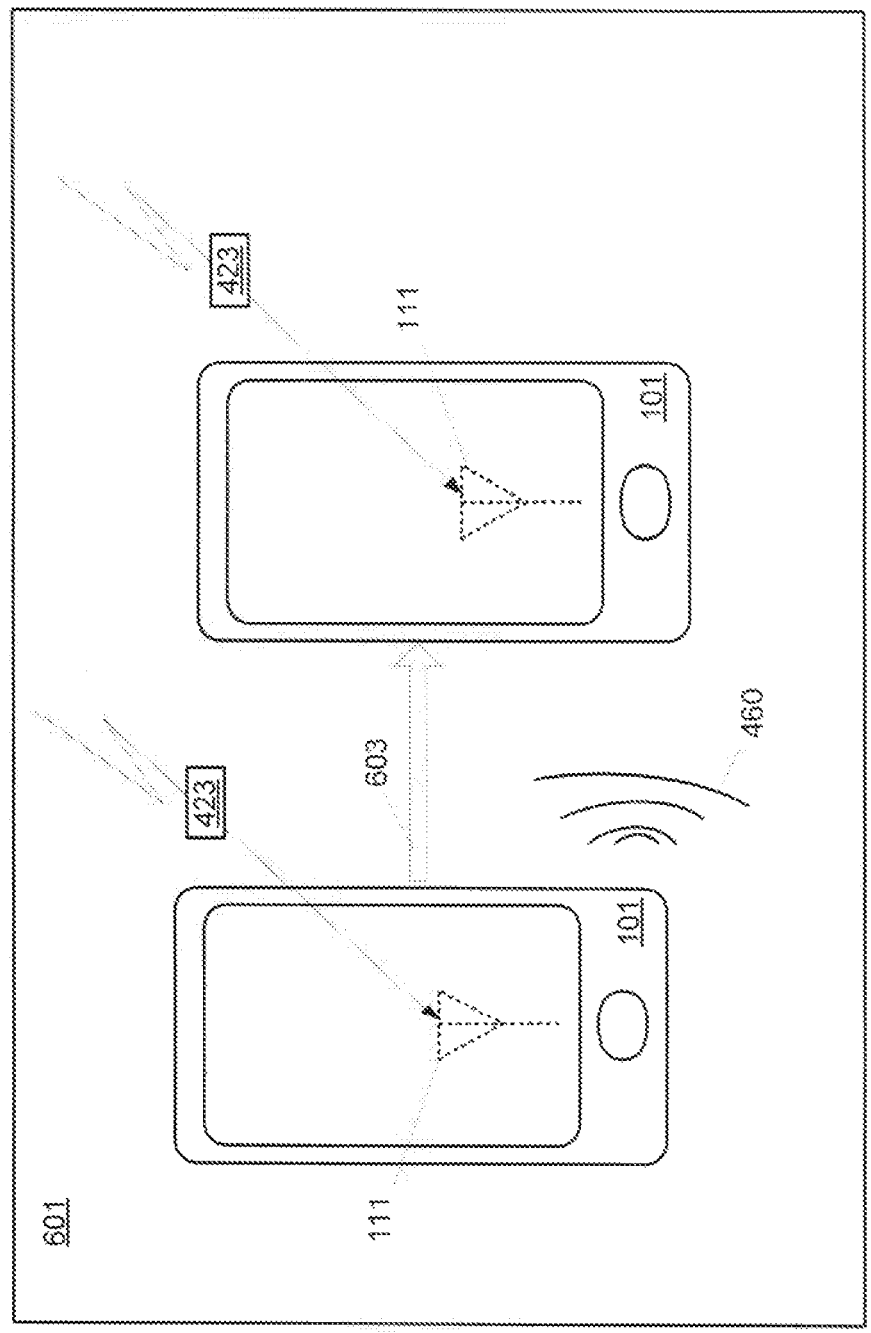
FIG. 6 depicts the device of FIG. 1 moving on a surface when a vibrating device thereof is activated, according to non-limiting implementations.

Antenna is next directed to FIG. 6, which depicts a schematic perspective view of device 101 located on a surface 601 (such as a table, and the like), and a non-limiting example of blocks 303, 305 of method 300. On the right side of FIG. 6, device 101 is located in a starting position; it is furthermore assumed that surface 601 is flat and parallel to the ground, that data 423 is being received at antenna 111 and that a first threshold condition has been met (e.g. as in FIG. 4, and as at block 303 of method 300); hence vibrating device 121 (e.g. internal to device 101) is vibrating (as indicated by lines 460).

Hence, as indicated by arrow 603, device 101 moves and/or repositions on surface 601 due to the vibration and hence so does antenna 111, which can change the data quality parameter of antenna 111. In other words, such movement can change the error rate and/or bit error rate and/or a signal strength and/or received signal strength.

However, such movement can cause the error rate and/or bit error rate to increase or decrease or remain the same. When the error rate and/or bit error rate decreases and falls below the threshold error rate (and/or threshold bit error rate), controller 120 controls vibrating device 121 to deactivate. When the error rate and/or bit error rate increases or remains the same, controller 120 controls vibrating device 121 to deactivate after a timeout period.

Similarly, such movement can cause signal strength and/or received signal strength to increase or decrease or remain the same. When the signal strength and/or received signal strength increases and exceeds the threshold signal strength (and/or threshold received signal strength), controller 120 controls vibrating device 121 to deactivate. When the signal strength and/or received signal strength decreases or remains the same, controller 120 controls vibrating device 121 to deactivate after the timeout period.

Regardless, on the right side of FIG. 6, controller 120 has controlled vibrating device to deactivate (e.g. as in FIG. 5, and as at block 305 of method 300) and device 101 is located in a new position relative to the starting position. While the new position is to the right of the starting position, such movement is understood to be an example only and activation of vibrating device 121 can cause random movement of device 101 and/or movement in a particular direction, depending on a location of vibrating device 121 within device 101 and/or a slope of surface 601. Furthermore, such movement can be rotational; in other words, device 101 may not move linearly along surface 601 but can rotate.

Figure 7:
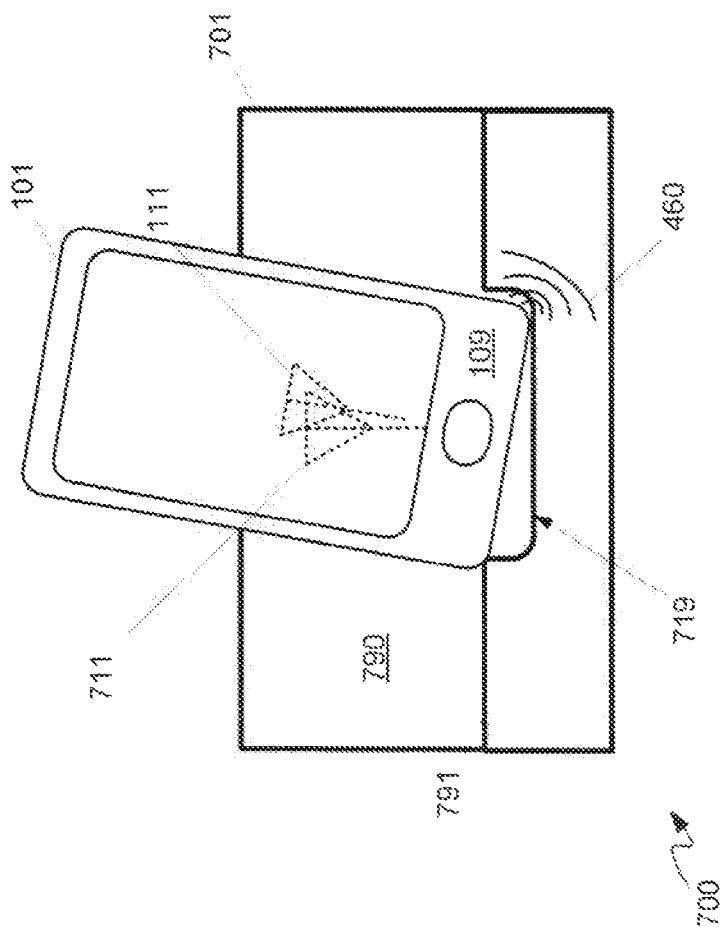
FIG. 7 depicts a system comprising the device of FIG. 1 and a docking station, according to non-limiting implementations.

Attention is next directed to FIG. 7 which depicts a front perspective schematic view of a system 700 that comprises device 101 and a docking station 701. Docking station 701 comprises a respective antenna 711 and a minimum energy position 719 configured to receive chassis 109 of device 101. In particular minimum energy position 719 comprises a slot and/or a recess and the like, in docking station 701 that is a shape complementary to an end of chassis 109 of device 101 such that, when device 101 is placed in docking station 701, the complementary end of chassis 109 can rest in, and/or be received in, the slot and/or the recess (and the like) of minimum energy position 719.

In particular, respective antenna 711 of docking station 701 is located such that respective antenna 711 of docking station 701 and antenna 111 of device 101 are in alignment when chassis 109 is received in minimum energy position 719. Antenna 711 is depicted in outline indicating a respective position of antenna 711 with respect to minimum energy position 719 and antenna 111, and also to indicate that, antenna 711 can be internal to docking station 701.

However, as depicted, device 101 is not received in minimum energy position 719 and hence antennas 111, 711 are not aligned; rather, device 101 has been places on docking station 701 such that only a portion of chassis 109 is in the slot and/or the recess (and the like) of minimum energy position 719.

As depicted, however, blocks 301, 303 of method 300 have been implemented at device 101, and hence device 101 is vibrating (as indicated by lines 460; as vibrating device 121, internal to device 101, is vibrating). In other words, controller 120 of device 101 has determined that a data quality parameter of antenna 111 meets a first threshold condition, as described above.

Figure 8:
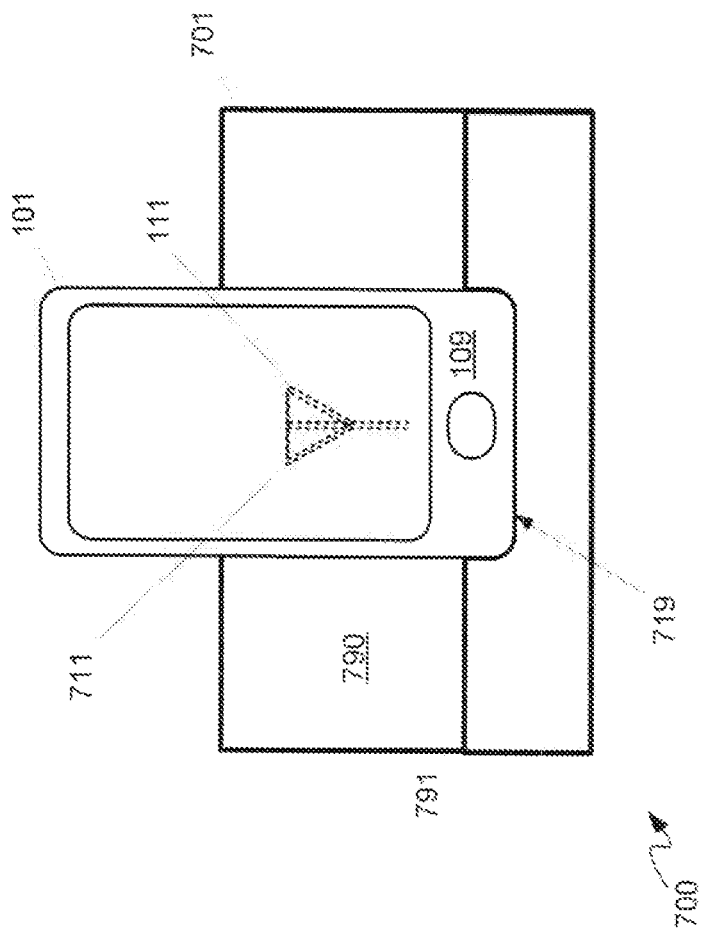
FIG. 8 depicts the system of FIG. 7 after the device has automatically moved into a minimum energy position of the docking station, according to non-limiting implementations.

Attention is hence next directed to FIG. 8 which depicts system 700 after method 300 has been implemented at device 101, and chassis 109 of device 101 has hence moved into minimum energy position 719, thereby aligning antennas 111, 711, causing the second threshold conditions to be met. In other words, implementation of method 300 at device 101 can cause device 101 to move into minimum energy position 719, thereby aligning antennas 111, 711.

In other words, a minimum energy position of docking station 701, as described herein, can comprise a position where device 101 has a minimum gravitational potential energy as compared to other positions in which device 101 can be located at docking station 701. Hence, the minimum energy position is generally a position where device 101 would be located to minimize gravitational potential energy at docking station 701 and hence the minimum energy position is generally defined with respect to docking station 701 being in a particular orientation with respect to the earth. For example, as depicted in FIG. 7 and FIG. 8, minimum energy position 719 comprises a slot or a groove opening upwards, with a bottom that is lower than adjacent walls of docking station 701.

Indeed, as depicted, docking station 701 further comprises a wall 790, which can be sloped away from a slot and/or recess of minimum energy position 719, and a ledge 791, to both better support device 101 and to promote movement of device 101 into minimum energy position 719 when device 101 vibrates. For example, as depicted in FIG. 7, a corner of device 101 rests on ledge 791 while another corner is located in minimum energy position 719, minimum energy position 719 extending down into ledge 791; when device 101 vibrates, the corner of device 101 resting on ledge falls down into minimum energy position 719, into the position depicted in FIG. 8.

In some implementations, docking station 701 can be configured to charge device 101 via antennas 111, 711; in particular, in these implementations, each of antennas 111, 711 can comprise short-range antennas configured to transfer power, inductively, from antenna 711 to antenna 111 to charge battery 199, and the like, of device 101, for example using charging device 198, which can regulate charging of battery 199 using power received using antenna 111. Hence, in these implementations, each of antennas 111, 711 can include one or more of an induction antenna and a loop antenna. Furthermore, in these implementations, docking station 701 can include a wireless charging pad. In these implementations, method 300 can include receiving power and/or inductively receiving power at antenna 111 and charging battery 199 using the power; such receipt of power and charging can occur in parallel and/or in conjunction with any of blocks 301, 303, 305 of method 300.

Figure 9:
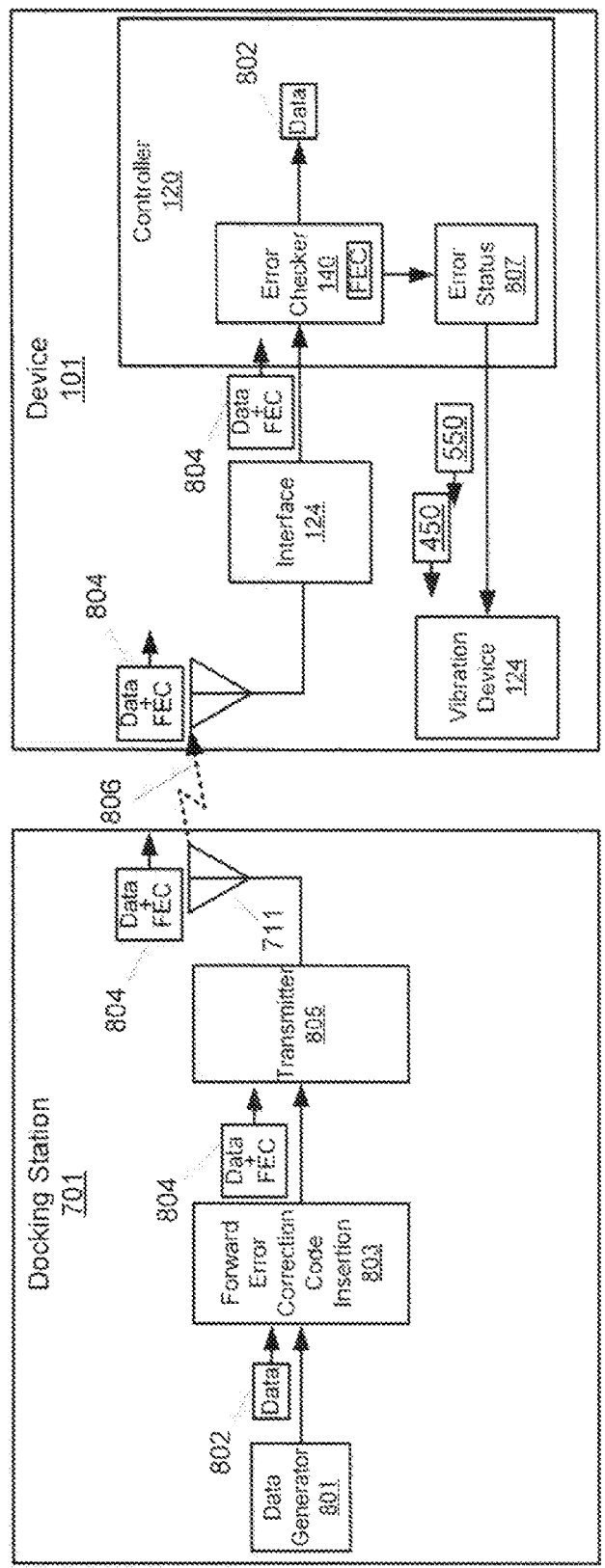
FIG. 9 depicts a module-based block diagram of the system of FIG. 7, according to non-limiting implementations.

Attention is next directed to FIG. 9 which depicts a module-based block diagram of device 101 and docking station 701 of system 700. In particular FIG. 9 depicts various functionality modules of device 101 when processing application 136, and various functionality modules of docking station 701. However, such modules are depicted for clarity only and functionality of controller 120 (and/or application 136) and/or docking station 701 need not be provided in a modular format.

Furthermore, while not depicted, docking station 701 can comprise a respective controller, a respective memory and, in particular a respective power supply which can include, but is not limited to, connection to a mains power supply, such that mains power can be converted to inductive power and transferred to device 101 via antennas 111, 711.

In any event, docking station 701 comprises a data generator module 801, which can generate data 802 that can optionally be encoded in a power signal when docking station 701 is used to charge battery 199 and/or when docking station 701 comprises a wireless charging pad; data 802 is received at a forward error correction (FEC) code insertion module 803, which inserts FEC codes into data 802, producing FEC code data 804. FEC code data 804 is transmitted to device 101 in a channel using a transmitter 805 and antenna 711, for example in a power signal 806. FEC code data 804 is received at controller 120 of device 101, using antenna 111 and interface 124. In these implementations, error checker 140 can extract the FEC codes from FEC code data 804 and determine whether the first threshold condition is met, for example whether the error rate of FEC code data 804 exceeds a threshold error rate and/or a threshold bit error rate. An optional error status module 807 of controller 120 can determine the status of the FEC codes (e.g. meets first threshold condition, a type of error, a number of errors) and transmit command 450 or command 550 to respectively activate or deactivate vibrating device 121, depending on whether the first threshold condition or the second threshold condition is met, as described above. Furthermore, data 802 (after FEC codes are extracted) can be further processed by controller 120.

For example, data 802 can comprise a command indicative of charging conditions provided by docking station 701. Alternatively, data 802 can comprise audio data and/or video data to be rendered and/or provided and/or played by device 101 (e.g. using speaker 132 and/or display device 126).

In addition, power received by device 101 in power signal 806 can be used to charge battery 199 of device 101, for example using charging device 198.

Hence, in these implementations, docking station 701 comprises an inductive charging station and/or a wireless charging pad, adapted for insertion of FEC codes in data 802 to be transmitted to device 101, in order to assist in aligning antennas 111, 711 for more efficient charging of device 101. An amount of FEC codes applied can depend on an application and resolution of the positioning of device 101 at docking station 701; for example, when precise positioning of device 101 is desired, more FEC codes can be inserted at data 802. Such precise positioning can be desired when docking station 701 comprises an inductive charging station and/or a wireless charging pad, and/or when data 802 composes sound data and/or video data.

Indeed, while data 802 can comprise test data used merely to provide a template into which to insert FEC codes for aligning antennas 111, 711, in other implementations, docking station 701 can comprise a memory storing sound data and/or video data, and/or docking station 701 can be configured to generate and/or receive sound data and/or video data and transmit the sound data and/or video data to device 101 for playback. Positioning of device 101 at docking station 701 can hence be more precise for video applications than sound applications and a number of FEC codes can be adjusted by a controller of docking station 701 accordingly. Furthermore, transmission of sound data and/or video data to device 101 can occur in addition to charging However, in other implementations, docking station 701 can be configured to transmit FEC code data 804 to device 101 without charging device 101, for example to transmit sound data and/or video data to device 101. Hence, method 300 can be implemented at device 101 to align antennas 111, 711 for more efficient communication of data 802 from docking station 701 to device 101 regardless of charging.

Indeed, in some of these implementations, docking station 701 can comprise sensors, and the like, configured to sense an environment of docking station 701 and transmit sensor data to device 101, for example for display at display device 126. However, other types of data can be transmitted to device 101 generated using other types of sensors, and the like.

Furthermore, operation of system 700 has been described with respect to the use of forward error correction code insertion, forward error correction codes being known to persons of skill in the art; in these implementations, error checker 140 (and/or error status module 807, which can be combined) are compatible with forward error correction codes and can be specifically configured to extract forward error correction code from data received by antenna 111. However, other types of error checking are within the scope of present implementations; for example, in some implementations error checker 140 (and/or error status module 807) can be configured to determine errors in data received by antenna 111 that are not forward error correction codes, for example, using error checking algorithms and/or error checking codes that can include, but are not limited to repetition schemes, parity bits, checksums, cyclic redundancy checks, and the like. When docking station 701 includes an error insertion module, error checker 140 (and/or error status module 807) and the error insertion module are compatible.

Figure 10:
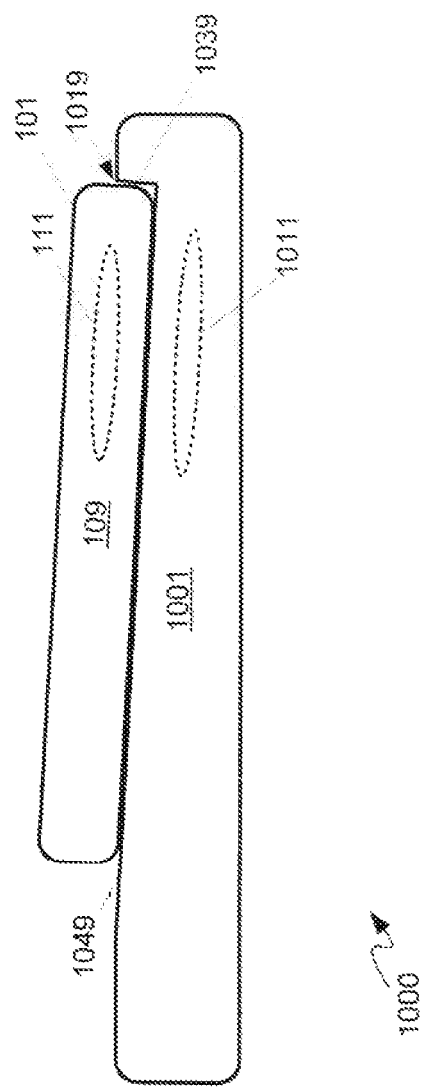
FIG. 10 depicts an alternative system comprising the device of FIG. 1 and an alternative docking station, according to non-limiting implementations.

Attention is next directed to FIG. 10, which depicts a side schematic view of an alternative system 1000 that includes device 101 and an alternative docking station 1001. A particular configuration of antenna 111 is depicted in outline, in which antenna 111 comprises a short-range inductive loop antenna; similarly, docking station 1001 comprises a respective antenna 1011 which also comprises a short-range inductive loop antenna. Hence, in these implementations, docking station 1001 comprises an inductive charging station and/or a wireless charging pad. Antenna 1011, when aligned with antenna 111, most efficiently charges device 101. In particular, docking station 1001 comprises a minimum energy position 1019 configured to receive chassis 109 of the device such that antenna 111 of device 101 and respective antenna 1011 of docking station 1001 are in alignment when chassis 109 is received in minimum energy position 1019, respective antenna 1011 configured to transmit data (and power) to antenna 111 of device 101, as described above.

As depicted, minimum energy position 1019 comprises a wall 1039 at a lower end of a top sloped surface 1049 of docking station 1001, and antenna 1011 is positioned such that when an end of chassis 109 is positioned against wall 1039, antennas 111, 1011 are aligned. Hence, when device 101 vibrates, for example when implementing method 300, device 101 slides along top sloped surface 1049 to rest against wall 1039 to align antennas 111, 1011.

As depicted, antennas 111, 1011 are located asymmetrically, respectively, within device 101 and docking station 1001 and hence an orientation of device 101 with respect to top sloped surface 1049 can be critical to ensure alignment of antennas 111, 1011 in minimum energy position 1019. Hence, in some implementations, docking station 1001 can comprise further mechanical apparatuses to ensure that device 101 is in the correct orientation, including, but not limited to, grooves, slots and the like such that device 101 can be received at top sloped surface 1049 in only one of two orientations (e.g. and not at 90° thereto). Such schemes can decrease the possibility of antenna 111, 1011 not being aligned in minimum energy position 1019. In yet further implementations, docking station 1001 can comprise alphanumeric and/or symbolic instructions indicating a correct orientation of device 101 on docking station 1001 (e.g. text and/or an arrow indicating that a top of device 101 is to be oriented upwards on top sloped surface 1049 such that an end of chassis 109 that includes antenna 111 is oriented towards wall 1039).

However, in other implementations, antennas 111, 1011 can be located symmetrically, respectively, within device 101 and docking station 1001 and hence an orientation of device 101 with respect to top sloped surface 1049 can be irrelevant, with antennas 111, 1011 being aligned in minimum energy position 1019 regardless of an orientation of device 101 with docking station 1001.

Docking station 1101 can otherwise be any given shape including, but not limited to, circular, rectangular, square, triangular, and the like.

Figure 11:
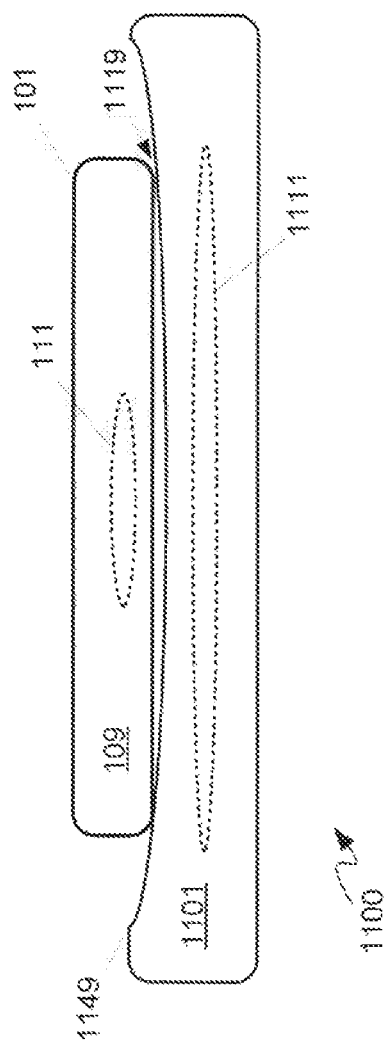
FIG. 11 depicts yet a further alternative system comprising the device of FIG. 1 and yet a further alternative docking station, according to non-limiting implementations.

Attention is next directed to FIG. 11, which depicts a side schematic view of an alternative system 1100 that includes device 101 and an alternative docking station 1101. A particular configuration of antenna 111 is depicted in outline, in which antenna 111 comprises a short-range inductive loop antenna; similarly, docking station 1101 comprises a respective antenna 1111 which also comprises a short-range inductive loop antenna. Hence, in these implementations, docking station 1101 comprises an inductive charging station and/or a wireless charging pad. Antenna 1111, when aligned with antenna 111, most efficiently charges device 101. In particular, docking station 1101 comprises a minimum energy position 1119 configured to receive chassis 109 of the device such that antenna 111 of device 101 and respective antenna 1111 of docking station 1101 are in alignment when chassis 109 is received in minimum energy position 1119, respective antenna 1111 configured to transmit data (and power) to antenna 111 of device 101, as described above.

As depicted, antennas 111, 1111 are oriented symmetrically, respectively, within device 101 and docking station 1101 and hence an orientation of device 101 with respect to docking station 1101 can be irrelevant, with antennas 111, 1111 being aligned in minimum energy position 1119 at docking station 1101 regardless of an orientation of device 101 with docking station 1101.

In particular, as depicted a top surface 1149 of docking station 1101 comprises a depression and/or a recession which can, for example, be bowl-shaped such that, when device 101 vibrates when implementing method 300, device 101 moves such that a center of device 101 is centered on the bowl-shape. In some of these implementations, docking station 1101 can otherwise be circular, as is the bowl-shape; however at least docking station 1101 any given shape including, but not limited to, circular, rectangular, square, triangular, and the like. Similarly, top surface 1149 of docking station 1101 can comprise any shape and/or configuration which promotes movement of device 101 into minimum energy position 1119 when device 101 vibrates.

In implementations described heretofore, device 101 comprises only one vibrating device 121 and hence when vibrating device 121 is activated, movement of device 101 can be generally affected by a position of vibrating device 121 in device 101, as well as a configuration of a surface and/or docking station on which device 101 is positioned.

However, attention is next directed to FIG. 11 which depicts a schematic diagram of an alternative device 101a, alternative device 101a being substantially similar to device 101 with like elements having like numbers with, however, an "a" appended thereto. Hence, device 101a comprises: a controller 120a (which can include an optional error checker 140a); a first vibrating device 121a-1; and an antenna 111a, as well as a chassis 109a, a controller 120a, a memory 122a (storing an application 136a), a display device 126a, a communication interface 124a, at least one input device 128a, a speaker 132a, a microphone 134a, a battery charging device 198a and a battery 199a.

However, in contrast to device 101, device 101a further comprises a second vibrating device 121a-2 which is located at a different position within device 101a than first vibrating device 121a-1. Vibrating devices 121a-1, 121a-2 will be interchangeably referred to hereafter, collectively, as vibrating devices 121a and, generically, as a vibrating device 121a.

Furthermore, a direction of movement of device 101a can be controlled depending on which of vibrating devices 121a are activated and/or depending on a relative rate of vibrating of each of vibrating devices 121a. For example, vibrating devices 121a can be located in opposite corners of device 101a and configured to operate independent of one another such that each can be controlled to be activated simultaneously, or in a sequence; furthermore, a rate and/or frequency of vibration of each can be controlled independent of one another. Such control of vibrating devices 121a can be used in a feedback loop by controller 120a when monitoring a data quality parameter of antenna 111 to attempt to meet a second threshold condition, as defined above (e.g. to lower an error rate and/or increase a signal strength).

Figure 12:
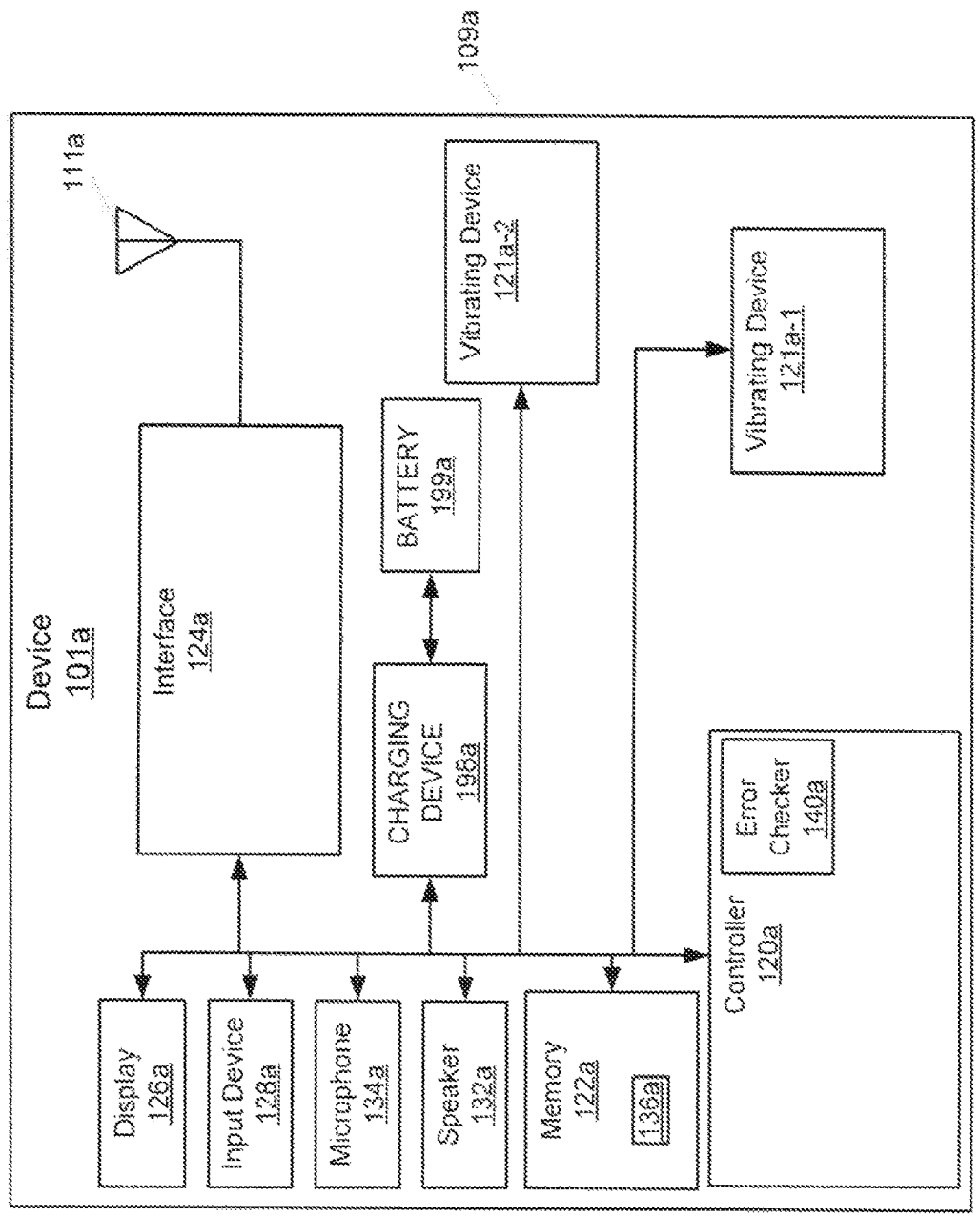
FIG. 12 depicts a schematic diagram of an alternative device for antenna alignment using vibrational positioning, according to non-limiting implementations.

Furthermore, while only two vibrating devices 121a are depicted in FIG. 12, in other implementations, device 101a can comprise more than two vibrating devices 121a, all of which can be operated independently by controller 120a and/or controlled to a rate and/or frequency of vibration independent of one another Controller 120a is hence generally configured to implement a variation of method 300 to control vibrating devices 121a, and specifically configured to; monitor a data quality parameter of antenna 111a; when the data quality parameter meets a first threshold condition, activate one or more vibrating devices 121a; and, when a second threshold condition is met, after the one or more vibrating devices 121a are activated, deactivate the one or more vibrating devices 121a. In particular, the one or more vibrating devices 121a can be controlled in a feedback loop with data quality parameter of antenna 111a; for example when one or more vibrating devices 121a are activated, and an error rate increases (and/or a signal strength decreases), controller 120a can change control of one or more vibrating devices 121a to attempt to cause the error rate to decrease (and/or the signal strength to decrease). For example, controller 120a can activate and deactivate different vibrating devices 121a and/or control relative and/or absolute frequencies of vibrating devices 121a until an error rate increases (and/or a signal strength decreases). Otherwise, the one or more vibrating devices 121a can be deactivated after a timeout period.

Hence, provided herein are devices and methods for antenna alignment using vibrational positioning. In particular, automatic optimal antenna positioning can occur by using a signal quality information of a channel to control a vibrational positioning scheme. In some implementations, signal quality can be determined by the number of bit errors received over a channel, and an antenna position that provides minimum bit errors can be deemed optimal. In some implementations, a device can be configured for location at a docking station that can include a data generator providing data to be transmitted. Such data to be transmitted can have Forward Error Correction codes applied to the data. The amount of correction codes applied can depend on an application and resolution of the positioning. The data, along with the correction codes are transmitted to the device over a channel, such as a channel to be characterized. The received data at the device can be processed with an error checking module which can be configured to determine a number of errors, a type of errors, and an error rate. An antenna position can be adjusted to minimize errors in the received data, for example by controlling a haptic vibrating device to reposition the device into a minimum energy position at the docking station where antennas of the device and docking station are aligned.

Those skilled in the art will appreciate that in some implementations, the functionality of devices 101, 101a, and docking stations 701, 1001, 1101 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 101a, and docking stations 701, 1001, 1101 can be achieved using a computing apparatus that has access to a code memory (not depicted) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive, flash memory, and the like). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem, network interface card, or other interface device connected to a network (including, without limitations, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is to be limited by the claims appended here.

What is claimed is:

1. A device comprising:
   a controller; a repositioning device; and an antenna configured to receive a signal from a second antenna of a second device; the controller configured to:
   monitor a data quality parameter of the antenna based on the signal from the second antenna;
   determine whether the data quality parameter meets a first threshold condition indicating a physical misalignment of the device with the second device;
   responsive to determination that the data quality parameter meets the first threshold condition, activate the repositioning device;
   responsive to activation of the repositioning device, determine whether the data quality parameter meets a second threshold condition indicating physical alignment of the device with the second device; and,
   responsive to determination that the second threshold condition is met, deactivate the repositioning device.

2. The device of claim 1, wherein the data quality parameter comprises an error rate of data received by the antenna; and the first threshold condition comprises the error rate being above a threshold error rate.

3. The device of claim 1, wherein the data quality parameter comprises an error rate of data received by the antenna; the first threshold condition comprises the error rate being above a threshold error rate; and the controller further comprises an error checker configured to determine one or more of the error rate, a number of errors and types of the errors.

4. The device of claim 1, wherein the second threshold condition comprises an error rate of data received by the antenna falling below a threshold error rate.

5. The device of claim 1, further comprising a chassis configured to rest in a minimum energy position of a docking station.

6. The device of claim 1, wherein the antenna comprises one or more of a short range antenna, and induction antenna and a loop antenna configured to receive one or more of power and data from an external short range antenna.

7. The device of claim 1, further comprising a battery and a battery charging device, the antenna configured to receive power from one or more of an external short range antenna, an inductive charging station and a wireless charging pad, the battery charging device configured to charge the battery using the power.

8. The device of claim 1, wherein the second threshold condition comprises a total time of the repositioning device being activated exceeding a time out period.

9. A method comprising:
   at a device including: a controller; a repositioning device; and an antenna configured to receive a signal from a second antenna of a second device, monitoring, at the controller, a data quality parameter of the antenna based on the signal from the second antenna;
   determining at the controller whether the data quality parameter meets a first threshold condition indicating a physical misalignment of the device with the second device;
   responsive to determining that the data quality parameter meets the first threshold condition, activating the repositioning device by the controller;
   responsive to activating the repositioning device, determining at the controller whether the data quality parameter meets a second threshold condition indicating physical misalignment of the device with the second device; and,
   responsive to determining that the second threshold condition is met, deactivating the repositioning device by the controller.

10. The method of claim 9, wherein the data quality parameter comprises an error rate of data received by the antenna; and the first threshold condition comprises the error rate being above a threshold error rate.

11. The method of claim 9, wherein the data quality parameter comprises an error rate of data received by the antenna; the first threshold condition comprises the error rate being above a threshold error rate; and the device further comprises an error checker configured to determine one or more of the error rate, a number of errors and types of the errors.

12. The method of claim 9, wherein the second threshold condition comprises one or more of: a total time of the repositioning device being activated exceeding a time out period; and an error rate of data received by the antenna falling below a threshold error rate.

13. The method of claim 9, wherein the device further comprises a chassis configured to be received in a minimum energy position of a docking station.

14. The method of claim 9, wherein the antenna comprises one or more of a short range antenna, and induction antenna and a loop antenna configured to receive one or more of power and data from an external short range antenna.

15. The method of claim 9, wherein the device further comprises a battery and a battery charging device, the antenna configured to receive power from one or more of an external short range antenna, an inductive charging station and a wireless charging pad, the battery charging device configured to charge the battery using the power.

16. A system comprising:
   a device including: a controller; a repositioning device; an antenna configured to receive a signal from a second antenna of a second device; and a chassis, the controller configured to:
   monitor a data quality parameter of the antenna based on the signal from the second antenna;
   determine whether the data quality parameter meets a first threshold condition indicating a physical misalignment of the device with the second device;

responsive to determination that the data quality parameter meets the first threshold condition, activate the repositioning device;

responsive to activation the repositioning device, determine whether the data quality parameter meets a second threshold condition indicating physical alignment of the device with the second device; and, responsive to determination that the second threshold condition is met, deactivate the repositioning device; and, a docking station comprising a respective antenna and a minimum energy position configured to receive the chassis of the device such that the antenna of the device and the respective antenna of the docking station are in alignment when the chassis is received in the minimum energy position, the respective antenna configured to transmit data to the antenna of the device.

17. The system of claim 16, wherein the data quality parameter comprises an error rate of the data received by the antenna; the first threshold condition comprises the error rate being above a threshold error rate; and the controller further comprises an error checker configured to determine one or more of the error rate, a number of errors and types of the errors.

18. The system of claim 16, wherein the data quality parameter comprises an error rate of the data received by the antenna; the first threshold condition comprises the error rate being above a threshold error rate; and the docking station further comprises a data generator and a forward error correction code insertion module.

19. The system of claim 16, wherein the antenna of the device comprises one or more of a short range antenna, and induction antenna and a loop antenna configured to receive one or more of power and data from the respective antenna of the docking station.

20. The system of claim 16 wherein the device further comprises a battery and a battery charging device, and the docking station comprises one or more of an inductive charging station and a wireless charging pad, the battery charging device configured to charge the battery using power received by the antenna from the respective antenna of the docking station.

* * * * *